United States Patent [19]

Thomas

[11] 4,238,705

[45] Dec. 9, 1980

[54] INCANDESCENT LAMP SEAL MEANS

[75] Inventor: George L. Thomas, Chesterland, Ohio

[73] Assignee: General Electric Company, Schenectady, N.Y.

[21] Appl. No.: 75,046

[22] Filed: Sep. 12, 1979

Related U.S. Application Data

[63] Continuation-in-part of Ser. No. 932,123, Aug. 9, 1978, abandoned.

[51] Int. Cl.$^3$ .............. C03C 3/04; H01J 5/48; H01K 1/38; H01K 1/42
[52] U.S. Cl. .................. 313/221; 313/222; 313/318; 106/52
[58] Field of Search .............. 106/52; 313/221, 222, 313/318

[56] References Cited

U.S. PATENT DOCUMENTS

| | | | |
|---|---|---|---|
| 3,582,703 | 6/1971 | Takahashi et al. | 313/222 |
| 3,912,960 | 10/1975 | Danko | 313/222 |
| 3,978,362 | 8/1976 | Dumbaugh, Jr. et al. | 106/52 |
| 4,012,263 | 3/1977 | Shell | 106/52 |
| 4,060,423 | 11/1977 | Thomas | 106/52 |
| 4,145,631 | 3/1979 | Saito | 313/222 |
| 4,149,103 | 4/1979 | Gates et al. | 313/318 |

Primary Examiner—Earl C. Thomas
Assistant Examiner—Mark Bell
Attorney, Agent, or Firm—John F. McDevitt; Lawrence R. Kempton; Philip L. Schlamp

[57] ABSTRACT

Hermetic seal construction for an incandescent lamp is described wherein a composite inlead structure is employed. A pair of inleads connected to the resistive incandescent filament in said lamp are joined at the opposite ends to larger diameter inlead wires in the hermetic seal region. The glass envelope of said lamp utilizes glasses having the following compositional limits in percent by weight:

| Oxides | Weight Percent Range |
|---|---|
| $SiO_2$ | 54–71 |
| $Al_2O_3$ | 12–18 |
| BaO | 10–23 |
| CaO | 4–8 |
| $R_2O$ | 0–3 | except for incidental impurities, residual fluxes, and refining agents. These glasses have improved reboil resistance and can be sealed directly to tungsten or molybdenum metal inleads to provide said direct hermetic seal.

7 Claims, 2 Drawing Figures

INCANDESCENT LAMP SEAL MEANS

This application is a continuation-in-part of Ser. No. 932,123, filed Aug. 9, 1978, and now abandoned.

BACKGROUND OF THE INVENTION

This invention relates generally to improvements made upon high temperature aluminosilicate seal glasses containing CaO and BaO which are described and claimed in U.S. Pat. No. 4,060,423 and assigned to the assignee of the present invention. The present glasses maintain the metal oxide combinations within specified weight percent ranges as follows: $SiO_2 + Al_2O_3$ 73–83, $BaO + CaO$ 17–30 and with further ratios between BaO and CaO being maintained within the range 2.3 to 3.5, for greater reboil resistance. The term "reboil" as used herein is a tendency of the glass upon flame reworking or reheating to form many small bubbles of entrapped gases in the glass which produce poor light transmission as well as weaken the reheated areas. While small amounts of alkali metal oxides have been used in the past to reduce reboil, certain incandescent lamp types, such as the tungsten-halogen cycle lamp, cannot tolerate more than 300 ppm of a alkali metal oxide in the lamp glass envelope without experiencing operating difficulties. On the other hand, it is within contemplation of this invention to have 0–3 weight percent of an alkali metal ion in the present glasses for use in other incandescent lamp types requiring direct hermetic seals to tungsten and molybdenum components. For example, the present glasses can be substituted for the customary soda lime silicate glasses now providing the transparent envelope for conventional incandescent lamps having a resistive incandescent filament if higher lamp operating temperatures are required.

It has been discovered by the present applicant that the ratio of BaO to CaO in high temperature aluminosilicate glasses is critical for controlling reboil of the glass. Glasses having a ratio less than about 2.3 will tend to have some reboil on reheating and flame working of the glass, with the reboil becoming more severe as this ratio decreases. While increasing the $SiO_2$ content in the glass can reduce reboil, such increased $SiO_2$ content lowers the thermal expansion of the glass and for glasses to be useful in direct hermetic sealing to tungsten as well as molybdenum metals, an average thermal coefficient of expansion in the 0°–300° C. temperature range between about $37 \times 10^{-7}$ cm/cm/°C. to about $50 \times 10^{-7}$ cm/cm/°C. is required. The prior art glasses disclosed in the aforementioned issued U.S. patent have a thermal expansion coefficient suitable for hermetic seals only to metals with an expansion coefficient matching molybdenum. It is now possible by maintaining the BaO content at 10 percent by weight or greater and controlling the remaining metal oxides within critical proportions to achieve a proper match with metals having a lower expansion coefficient such as tungsten.

Specifically, the present invention relates to a novel hermetic seal means for an incandescent lamp utilizing the above identified improved seal glasses as the transparent lamp envelope and wherein the inlead construction of said lamp has a particular configuration. In said improvement, the pair of conductive inleads which are customarily connected to each resistive incandescent filament providing the light source in said lamp are further joined to relatively larger diameter inleads in the hermetic seal region which serve as adequate mechanical support means for the entire lamp. Joinder of the different size inleads at the hermetic seal region permits reliable hermetic sealing only to the smaller diameter inleads since it is not required that the larger diameter inleads extending therefrom and projecting outwardly from the lamp glass envelope also be hermetically sealed to the glass. Since the hermetic sealing of the larger diameter inleads has been obviated in this manner, there is no longer need for said larger diameter inleads to exhibit thermal expansion characteristics suitable for direct sealing to the lamp glass envelope and less expensive metals than tungsten or molybdenum can be employed for said components. Accordingly, known iron alloys including Kovar type alloys and other conductive metals now used as inlead materials in lamp construction can serve as the larger diameter inleads for the presently improved lamp.

SUMMARY OF THE INVENTION

It is an object of the present invention, therefore, to provide improved sealing means for an incandescent lamp utilizing either tungsten or molybdenum components to which the glass is directly sealed. It is a further object to provide an improved aluminosilicate glass for said sealing means which is essentially free of reboil tendency during the sealing operation. A still further important object of the present invention is to provide a glass composition for said sealing means having $SiO_2$, $Al_2O_3$, CaO and BaO in critical proportions as the essential metal oxides but which can further contain minor amount of alkali metal oxides without producing detrimental effects upon the desired sealing characteristics.

Briefly stated, the present glass compositions for use in the improved lamp construction consist essentially of metal oxides as calculated from the starting batch of materials in approximate percents by weight 54–71 $SiO_2$, 12–18 $Al_2O_3$, 10–23 BaO, 4–8 CaO, and 0–3 $R_2O$, wherein R is an alkali metal ion, along with minor amounts of incidental impurities, residual fluxes and refining agents such that the aggregate $SiO_2$ and $Al_2O_3$ content lies within the approximate range 73–83 weight percent, the aggregate BaO and CaO content lies within the approximate range 17–30 weight percent, and the weight ratio between BaO and CaO lies within the approximate range 2.3 to 3.5 so as to provide improved reboil resistance. A preferred glass composition for sealing directly to tungsten metals contains an aggregate BaO and CaO content lying in the approximate range 17–21 weight percent and exhibits an average coefficient of linear thermal expansion in the 0°–300° C. temperature range between about $37 \times 10^{-7}$ cm/cm/°C. to about $41 \times 10^{-7}$ cm/cm/°C. A different preferred glass for sealing directly to molybdenum metals contains an aggregate BaO and CaO content lying in the approximate range 21–30 weight percent and exhibits an average coefficient of linear thermal expansion in the 0°–300° C. temperature range between about $41 \times 10^{-7}$ cm/cm/°C. and $50 \times 10^{-7}$ cm/cm/°C. Both preferred glasses further desirably exhibit a strain point of at least about 730° C. and a softening point in the 1,000°–1,140° C. range while retaining a relatively low liquidus temperature not exceeding 1,350° C.

DESCRIPTION OF THE PREFERRED EMBODIMENTS

Figure 1:
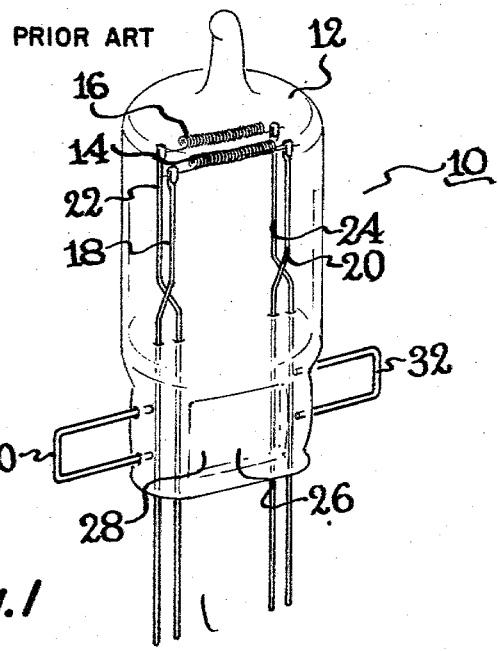
FIG. 1 depicts in perspective a prior art incandescent lamp construction employing mechanical support means for said lamp.

Referring to FIG. 1 there is shown in perspective a conventional incandescent lamp 10, of the well known tungsten halogen cycle type, which includes a transparent glass envelope 12 enclosing a pair of resistive incandescent filaments 14 and 16, of tungsten each connected to a pair of inlead supports commonly formed of molybdenum metal. The first pair of said inleads 18 and 20 provides the means of furnishing electrical energy to filament 14 while the remaining pair of said inleads 22 and 24 serves a corresponding function for filament 16. As can be further noted, all four inleads are hermetically sealed at one end of the tubular shaped lamp glass envelope 12 by a direct vacuum-tight pinch seal 26 of the glass to the relatively small diameter inlead elements. The conventional pinching step employed during lamp manufacture and commonly termed a press seal produces a glass-to-metal seal in the sealing region 28 of the lamp construction leaving the exteriormost ends of all four inleads protruding outwardly from the lamp glass envelopes. Another pair of metal supports 30 and 32 protrude outwardly in a lateral direction from the press seal end of said lamp glass envelope to serve as mechanical support means for the lamp construction. As can be noted from the drawing, said metal supports 30 are of a relatively larger diameter than the inlead elements 18-24 which are conventionally of smaller diameter to enhance vacuum-tight sealing and conserve costs. While some adherence of the glass to the metal supports 30 and 32 takes place, the ends of said members which project into the glass envelope are displaced from the sealing region 28 and thereby not hermetically sealed in the lamp construction. Not shown in said lamp construction is the conventional inert gas filling which further includes a halogen such as iodine to produce the well-known tungsten-halogen cycle.

Figure 2:
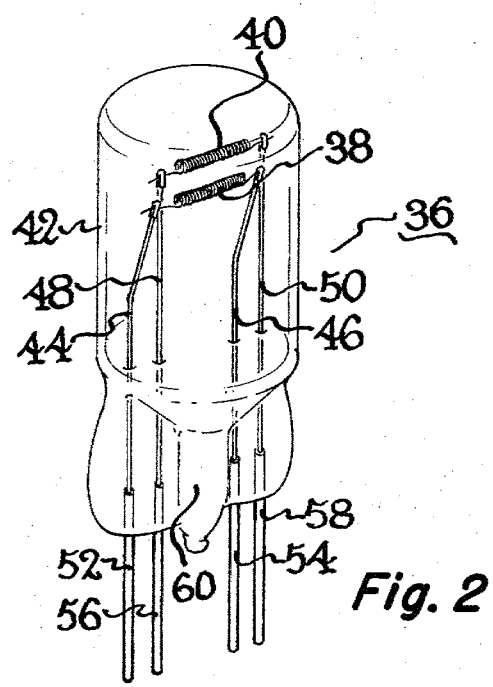
FIG. 2 depicts in perspective the improved seal means for an incandescent lamp made in accordance with the present invention.

In FIG. 2 there is also shown in perspective, a similar tungsten-halogen cycle lamp construction 36 having a pair of resistive incandescent filaments 38 and 40 enclosed within a transparent envelope 42 of the present glass compositions. Each of said filaments 38 and 40 are connected to a pair of inleads 44-46 and 48-50, respectively, with all four of said inleads being hermetically sealed at one end of the tubular shaped lamp glass envelope. The exteriormost end of each of said inleads 44, 46, 48 and 50, however, is joined by conventional means such as brazing or welding to relatively larger diameter inlead wires 52, 54, 56 and 58, respectively, at the hermetic seal region 60 of said lamp construction. By said means, a direct vacuum-tight pinch seal of the innermost smaller diameter inleads 44-50 is achieved along with providing adequate mechanical support for the entire lamp construction with the protruding ends of the larger diameter inleads 52-58 that extend outwardly from the lamp glass envelope.

As previously indicated, the improved hermetic seals obtained in accordance with the present invention are more free from reboil effect than is obtained with the glass composition disclosed in the aforementioned issued U.S. Pat. No. 4,060,423. It is also further possible with the present glass composition to provide such improved seal in incandescent lamps intended for high temperature use other than the above illustrated tungsten-halogen cycle lamp as well as permit further flexibility in construction of all said lamps by substitution of inlead metals other than tungsten or molybdenum for the large diameter inlead components of the particular lamp. The present glass compositions are still further distinctive from the glass compositions disclosed in the aforementioned issued U.S. patent with respect to certain other physical properties useful in construction and operation of these type lamps. Specifically, present glass compositions exhibit a softening point in the approximate range 1,000°–1,400° C. along with a strain point in the approximate range 730°–820° C. which raises the high temperature resistance to deforming of the glass when being used in a high temperature environment. On the other hand, the present glasses can still be drawn into tubing by conventional methods in high temperature glass melting furnaces and glass drawing equipment since the liquids temperatures during glass melting and forming still lie in the approximate temperature range 1,200°–1,325° C. Preferred glasses according to the present invention are reported in Table I below. As is common in glass technology, the glass compositions are reported in terms of oxides as calculated from the batch starting materials. Although there may be minor differences between the glass composition as calculated in the conventional manner from the batch constituents and the actual glass composition obtained therefrom, both compositions will be essentially the same. There is only slight volatilization of the batch constituents in the present glass composition during melting and which can be accompanied by pick-up of $ZrO_2$ and $Al_2O_3$ and other constituents at the trace level from any refractories employed to melt the glass. Consequently, the present invention contemplates use of said glass composition for the herein described seal improvement having the same composition ranges above set forth as calculated in the conventional manner from the starting batch formulations.

TABLE I

| Weight Percent | 1 | 2 | 3 | 4 | 5 | 6 | 7 |
| --- | --- | --- | --- | --- | --- | --- | --- |
| $SiO_2$ | 61.1 | 62.3 | 59.8 | 58.0 | 64.7 | 63.6 | 55.8 |
| $Al_2O_3$ | 14.2 | 12.8 | 15.5 | 16.2 | 17.5 | 17.3 | 15.0 |
| BaO | 18.1 | 18.2 | 18.0 | 19.3 | 13.0 | 13.0 | 22.5 |
| CaO | 6.6 | 6.7 | 6.6 | 6.5 | 4.8 | 4.8 | 6.7 |
| $K_2O$ | 0 | 0 | 0 | 0 | 0 | 1.3 | 0 |
| Softening Pt., °C. | 1014 | 1006 | 1030 | 1029 | 1120 | 1084 | 984 |
| Strain Pt. °C. | 750 | — | 748 | 747 | 801 | 784 | — |
| Coef. Exp. (0–300° C.)/°C. | 45.2 | 45.7 | 45.0 | 46.0 | 38.8 | 40.5 | 50.0 |
| Ratio BaO/CaO | 2.7 | 2.7 | 2.7 | 3.0 | 2.7 | 2.7 | 3.4 |
| % $SiO_2$ + $Al_2O_3$ | 75.3 | 75.1 | 75.3 | 74.2 | 82.2 | 80.9 | 70.8 |
| % BaO + CaO | 24.7 | 24.9 | 24.6 | 25.8 | 17.8 | 17.8 | 29.2 |

As can be noted from the foregoing Table, the glass composition in Example 6 further includes an alkali metal oxide in modest amounts while still maintaining all other metal oxide constituents within the critical proportions required to provide a seal glass composition exhibiting the desired improvements. The present glass composition is further amendable to incorporation of even lesser amounts of other oxides known to produce desired further effects such as absorption of ultraviolet radiation within the compositional ranges specified for the critical metal oxides and without detrimental effect upon the desired physical properties.

It will be apparent from the foregoing description, therefore, that a novel seal construction for an incandescent lamp is provided affording significant advantages for direct hermetic sealing of both tungsten and molybdenum inleads. It will also be apparent that minor variations in the disclosed glass compositions other than above specifically disclosed are contemplated for use. It is intended to limit the present invention, therefore, only by the scope of the following claims.

What I claim as new and desire to secure by Letters Patent of the United States is:

1. An improved incandescent lamp having a transparent glass envelope which contains a resistive incandescent filament connected to a pair of conductive inlead wires having an average thermal coefficient of expansion in the 0°–300° C. temperature range between about $37 \times 10^{-7}$ cm/cm/°C. to about $50 \times 10^{-7}$ cm/cm/°C. that are hermetically sealed to the glass envelope, the improvement wherein said inlead wires are joined to larger diameter inlead wires having greater thermal expansion characteristics in the hermetic seal region and the glass envelope comprises a glass composition which consists essentially of oxides in approximate percent by weight 54–71 $SiO_2$, 12–18 $Al_2O_3$, 4–8 CaO, 10–23 BaO, and 0–3 $R_2O$ wherein R is an alkali metal ion, along with minor amounts of incidental impurities, residual fluxes, and refining agents, such that the aggregate $SiO_2$ and $Al_2O_3$ content lies within the approximate range 73–83 weight percent, the aggregate BaO and CaO content lies within the approximate range 17–30 weight percent and the ratio between BaO weight percent and CaO weight percent lies within the approximate range 2.3 to 3.5 so as to provide improved reboil resistance.

2. An improved lamp as in claim 1 wherein the larger diameter inleads provide the sole mechanical support means for said lamp.

3. An improved lamp as in claim 1 wherein the hermetic sealing is a press seal.

4. An improved lamp as in claim 1 wherein the glass composition has an aggregate BaO and CaO content in the approximate range 17–21 weight percent and the average coefficient of linear thermal expansion in the 0°–300° C. temperature range is between about $37 \times 10^{-7}$ cm/cm/°C. to about $41 \times 10^{-7}$ cm/cm/°C.

5. An improved lamp as in claim 1 wherein the glass composition has an aggregate BaO and CaO content in the approximate range 21–30 weight percent and the average coefficient of linear thermal expansion in the 0°–300° C. temperature range is between about $41 \times 10^{-7}$ cm/cm/°C. and $50 \times 10^{-7}$ cm/cm/°C.

6. An improved lamp as in claim 1 wherein the incandescent lamp is a regenerative cycle halogen lamp and the inleads connected to the resistive incandescent filament are molybdenum or tungsten.

7. An improved lamp as in claim 6 wherein the larger diameter inleads are an iron alloy.

* * * * *